May 20, 1952  G. J. NASH  2,597,514
OVERLOAD TORQUE RELEASE MECHANISM
Filed March 27, 1945  3 Sheets-Sheet 2
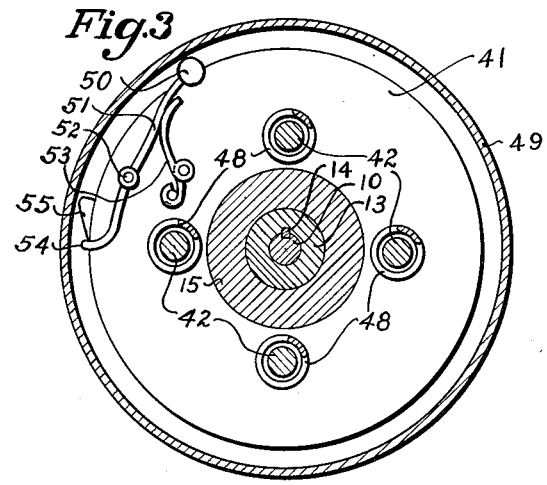
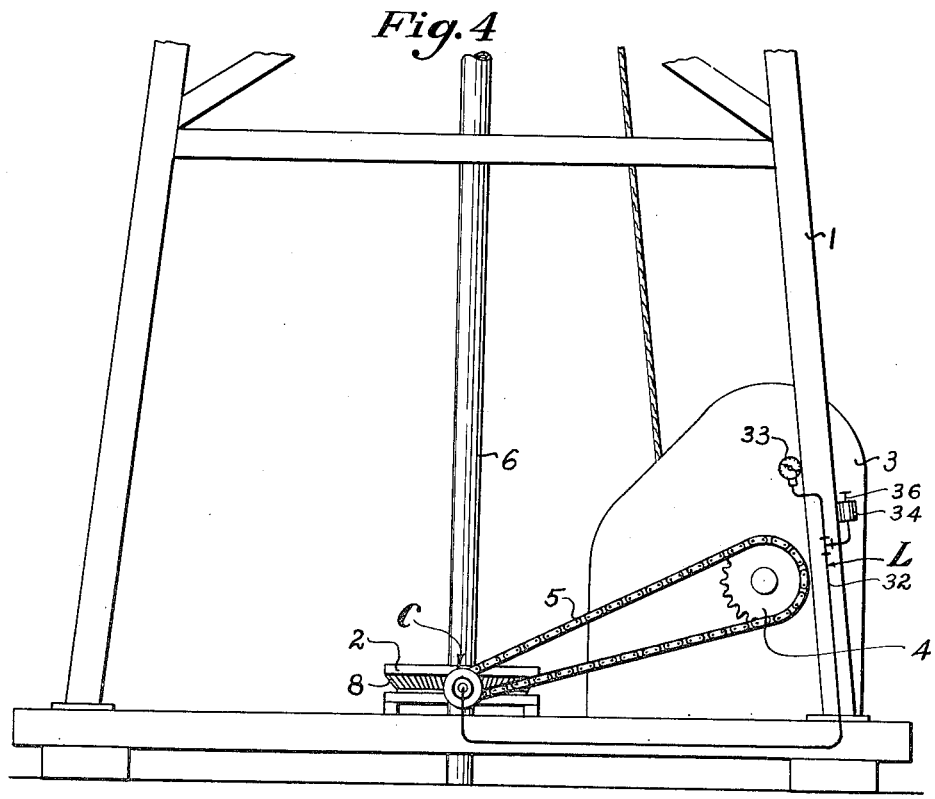
Gerald J. Nash
INVENTOR.
BY Wayland D. Keith
HIS AGENT.

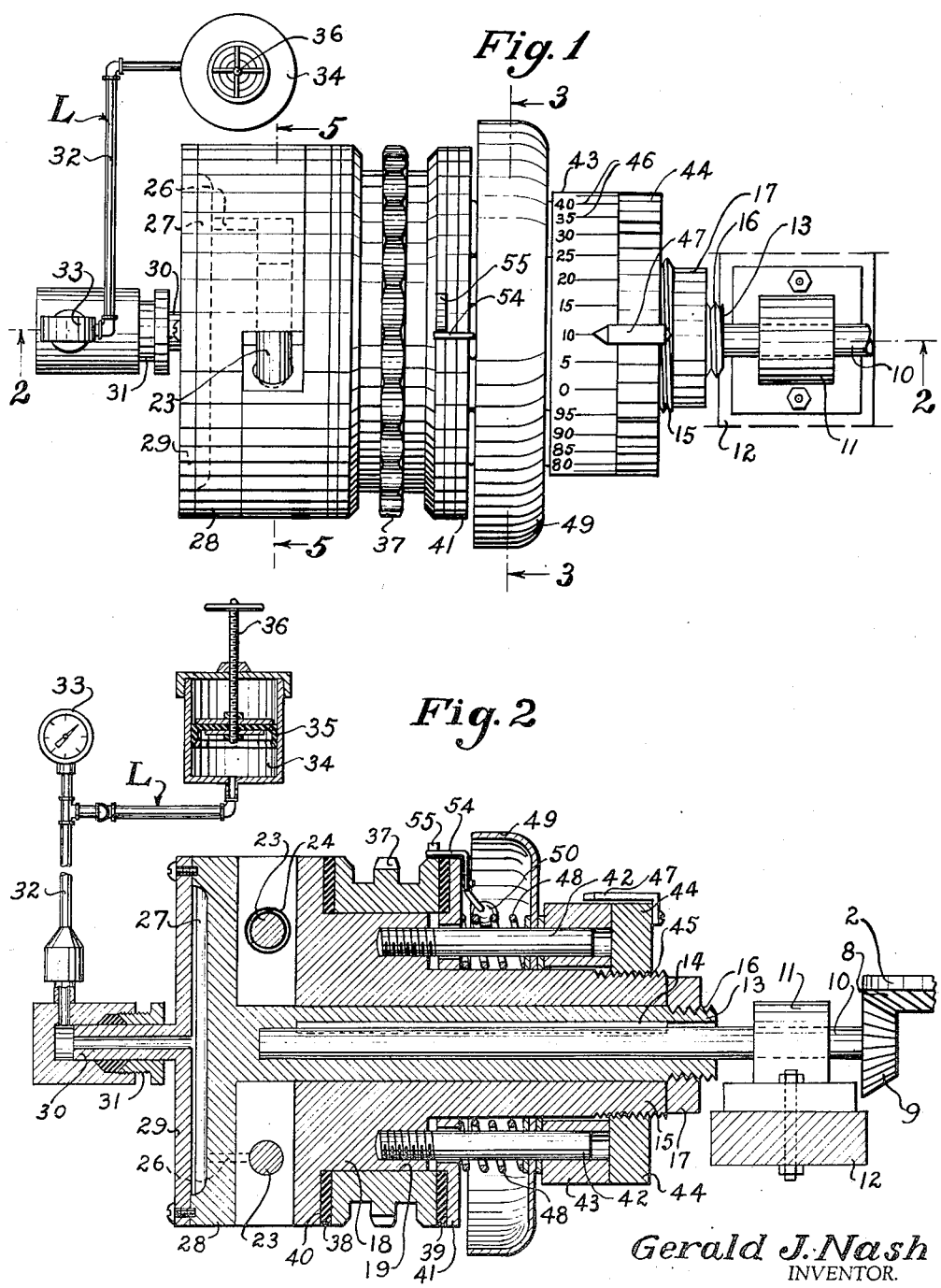

May 20, 1952  G. J. NASH  2,597,514
OVERLOAD TORQUE RELEASE MECHANISM
Filed March 27, 1945

Gerald J. Nash
INVENTOR.

BY Wayland D Keith
HIS AGENT.

Patented May 20, 1952

2,597,514

UNITED STATES PATENT OFFICE 2,597,514

OVERLOAD TORQUE RELEASE MECHANISM

Gerald J. Nash, Wichita Falls, Tex.

Application March 27, 1945, Serial No. 585,121

3 Claims. (Cl. 64—30)

This invention relates to improvements in combination overload torque releases and indicating mechanisms.

In the drilling of oil wells with rotary drilling apparatus, if too much torque is developed, or the drill stem should hang, or the load should become increased beyond the stress limit of the drill stem, the drill stem may be twisted off. When this occurs, an expensive and time-consuming fishing job is necessary to recover the equipment from the well. This equipment and the work done on the well may run into thousands of dollars, and in the event it cannot be recovered, the well may have to be abandoned. This would result not only in the loss of time, equipment and man hours, but possibly in the loss of a producing well.

While various mechanisms have been proposed for overload clutches or overload torque release mechanisms, these, for the most part, have been quite complicated and do not ordinarily give a correct indication of the amount of torque which the apparatus is set to release or slip.

Other attempts have been made to provide a combination overload mechanism and indicating means, but these generally have been complicated in structure and inaccurate in setting the amount of torque which the apparatus is set to release.

The primary object of this present invention is to provide a combination overload mechanism and indicating means, whereby the overload mechanism may be set to yield when a certain torque has been developed.

Another object of this invention is to provide an overload mechanism which will yield when a predetermined torque setting is reached and that will give a signal that such torque has been reached.

A still further object of this invention is to provide a torque indicating means associated with a torque release means whereby the torque release means may be set accurately and make possible an accurate check of the amount of torque transmitted at all times.

With the foregoing objects in mind and others that will manifest themselves as the description proceeds, reference is had to the accompanying drawings in which:

Fig. 1 is a plan view of the combination overload torque release mechanism and indicating mechanism;

Fig. 2 is a vertical section taken on the line 2—2 of Fig. 1;

Fig. 3 is a cross section taken on the line 3—3 of Fig. 1;

Fig. 4 is a side elevation of a rotary well drilling apparatus with parts broken away, illustrating the present invention as installed thereon;

Figure 5:
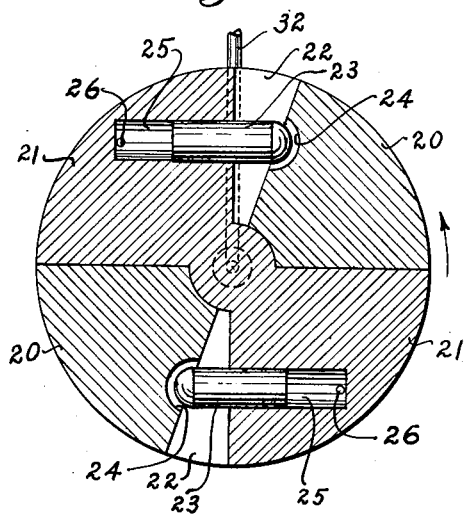
Fig. 5 is a cross section taken on the line 5—5 of Fig. 1.
Figure 6:
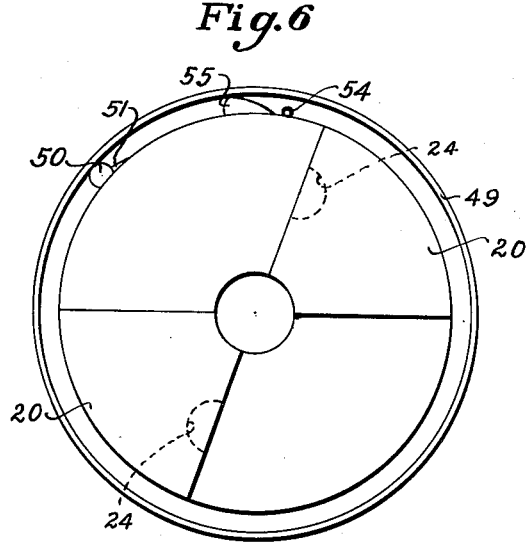
Fig. 6 is an end elevation of the overload torque release mechanism with the torque indicating mechanism removed therefrom.

Referring to Fig. 4 of the drawings, the numeral 1 designates a fragmentary portion of a conventional rotary well drilling derrick in which a rotary table 2 is located. A rotary drive mechanism 3 is positioned at one side of the rotary table 2 and has drive sprocket 4, operating a drive chain 5 in position to drive the rotary table 2 to turn the drill stem 6. A torque release mechanism C interconnects the chain 5 with sprocket 4 on the rotary draw works 3 in driving relation for turning the rotary table 2 through a conventional bevel gear 8 and a pinion 9.

The drill stem 6 carries a bit (not shown) on the lower end thereof and said drill stem is designed to withstand a rated amount of torque, and if the torque generated by the rotary table 2 becomes in excess of the amount which the drill stem 6 has been designed to withstand, the drill stem would twist off. In order to overcome this tendency, the present invention provides an overload torque release mechanism, generally designated at C, and which may be set at any predetermined point to release or slip when the torque reaches this setting.

The overload torque release mechanism C includes a shaft 10 connected with the pinion 9 and journaled in a bearing 11 mounted on a support 12, which support may be a part of the rig base adjacent the rotary table 2.

The shaft 10 extends into a tubular shaft 13 to which the shaft 10 is keyed at 14, so as to connect the shafts 10 and 13 together for joint rotation. The tubular shaft 13 is journaled in a bearing in a body 15 for free turning movement relative thereto, and extends substantially through the body, as shown in Fig. 2. One end of the tubular shaft 13 is externally threaded at 16 and is secured by a nut 17 threaded thereon against endwise displacement from the body 15.

The opposite end portion of the body 15 is provided with a hub portion 18 with a bearing seat 19 extending about the periphery of the hub portion, as hereinafter described.

Laterally of the hub portion 18 and integral therewith are formed segment jaws 20, diametrically opposite from each other and interfitting with segment jaws 21 formed integral with the hollow shaft 13. Each of the latter jaws extends approximately through 90° as shown in Fig. 5, but the jaws 20 extend through less than the circumferential distance between the jaws 21, being shown as approximately 75° in extent for purpose of illustration. This leaves a space 22 between one face of the jaw 20 and the adjacent face of the jaw 21 to allow for circumferential turning movement therebetween. The jaws 20 normally are held in the relative positions shown in Fig. 5, by pistons 23, one end of each of which engages in a concave seat 24 in the adjacent face of the jaw 20, while the body of the piston is slidably mounted in a cylinder 25 formed in the adjacent jaw 21. The pistons and cylinders 23—25 are disposed on diametrically opposite sides of the axis of the shafts 10, 13, so as to act equally and oppositely between the adjacent jaws 20—21.

The cylinders 25 have inlet passageways 26 leading thereto from a chamber 27 at the enlarged end portion 28 that carries the jaws 21, formed integral with the tubular shaft 13. The chamber 27 is closed at one side by a cover plate 29 secured to a side face of the enlarged portion 28. A stub shaft 30 is rigidly fixed to the cover plate 29 and extends axially therefrom, having a passageway therethrough for liquid communication with the chamber 27.

The stub shaft 30 is mounted in a packing gland 31 through which it communicates with a hydraulic system L that includes a pipe 32, a pressure gauge 33 and a hydraulic cylinder 34. The cylinder 34 is provided with a piston 35 therein to apply pressure to the liquid in the system L by the action of a screw 36 connected with the piston. Upon adjustment of the piston 35 to increase the pressure on the liquid in the system L, the increase of pressure will be indicated by the pressure gauge 33 which is preferably calibrated to read in terms of torque foot pounds or other indicating measure for the amount of force indicated by the overload mechanism.

The bearing 19 on the hub 18 has journaled thereon a sprocket gear 37 which is connected with the adjacent end of the sprocket chain 5 that extends therearound. The opposite sides of the sprocket gear 37 are provided with clutch facings 38 and 39. The facing 38 is in opposed relation to a lateral shoulder 40 provided on the hub portion 18, so as to provide a frictional driving relation therewith upon pressure of the sprocket 37 against the shoulder.

The clutch facing 39 is interposed between a side of the sprocket 37 and a clutch plate 41 which is sleeved loosely over the body 15 beside the hub portion 18, as shown in Fig. 2. This clutch plate 41 is confined circumferentially by a plurality of pins 42 which are threaded at one end into the adjacent side face of the hub portion 18 and are confined at the opposite end by a ring 43 that is sleeved loosely over the body 15. The ring 43 has openings therein slidably receiving the pins 42. The ring 43 is confined against axial displacement by a nut 44 which is screwed onto an externally screw-threaded portion 45 of the body 15.

The ring 43 is provided circumferentially with indicia 46 which are preferably in the form of graduated markings calibrated in terms of torque graduations, degrees, or the like. These indicia are arranged for cooperative relation with a pointer 47 secured to the nut 44 for adjustment of the setting of the torque mechanism.

Coiled springs 48 are sleeved over the pins 42 and interposed between the clutch disc 41 and the ring 43, tending to urge the clutch disc 41 in frictional bearing relation with the adjacent face of the sprocket gear 37. The tension of the springs 48 may be adjusted by rotation of the nut 44 on the threaded portion 45, which will force the ring 43 axially to vary the expansive action of the springs.

Also surrounding the body 15 beside the ring 43 is a dished bell member 49, the periphery of which is in position to be struck by a clapper 50 (Fig. 3) carried by a lever 51 pivotally mounted at 52 on the adjacent side of the clutch disc 41. The clapper 50 is held normally in a striking position by a leaf spring 53 bearing against the lever 51. The opposite end of the lever 51 from the clapper 50 is offset at 54 and extends over the peripheral edge portions of the sprocket gear 37 and clutch disc 41 in position to be engaged by a cam 55 provided on the peripheral portion of the sprocket gear 37 at one point in the circumference thereof. Therefore, during the rotation of the sprocket gear 37 relative to the clutch disc 41, the clapper 50 will strike the bell 49 once for each revolution.

In the operation of the overload mechanism, the hydraulic system L is filled with liquid of suitable properties and pressure applied thereto by the turning of the screw 36 until the desired pressure is indicated on the gauge 33. Then the pointer 47 is adjusted by the turning of the nut 44 to the desired point of slippage, applying the desired tension to the springs 48 and pressing the friction elements 38 and 39 in opposed relation between the sprocket gear 37 and the face 40 and clutch disc 41, respectively.

Then when power is transmitted by the chain 5 to the sprocket 37, the entire overload torque mechanism will rotate in unison with the sprocket by reason of the clutch connections at 38 and 39 between the sprocket and the body 15, which latter will also transmit this turning movement through the hydraulic connections 23—25 and the jaws 20—21 to the shafts 13 and 10 which in turn operate the rotary table 2. This turning movement will be in the direction indicated by the arrow in Fig. 5. The action of the jaws 20 on the pistons 23 will transmit a pressure through the hydraulic system to the gauge 33 to indicate the amount of torque being transmitted.

As long as the torque is not in excess of the predetermined setting of the pointer 47, the overload mechanism C will continue to rotate in unison under the action of the sprocket chain 5. However, if the drill stem 6 should hang or the load become excessive, this will tend to reduce the rotation of the rotary table 2 relative to the driving force being transmitted by the sprocket chain 5. The relative pressure therebetween will be sufficient to overcome the frictional pressure applied by the clutch facings 38 and 39 and will allow the sprocket gear 37 to slip with respect to the face 40 and clutch disc 41, so that the sprocket gear will turn relative to the body 15 and therefore relative to the clutch disc 41. As this slippage continues, the sprocket gear 37 will rotate through a complete revolution relative to the clutch disc which will cause the cam 55 to engage the end 54 of the lever 51 and move the clapper away from the bell 49, allowing the clapper to strike the bell under the action of the spring 53, as the end 54 moves off the cam 55. This indicates the relative slippage between these parts.

The setting of the pointer 47 with respect to the calibrations 46 can be checked and compared with the reading on the gauge 33. If these do not agree, the pointer 47 can be adjusted to obtain the correct reading or to vary the slippage at the desired torque. This will insure safety to the drill stem and to the other equipment, not only saving expense by preventing damage to this equipment, but also providing a safeguard against the twisting off of the drill stem in the well which would result in a great loss. Such a twisting off of the drill stem with the bit in the well, often necessitates an expensive fishing job in an effort to recover these parts, and moreover sometimes means the loss of the entire well.

It can be appreciated that the overload release means should be used with the indicating means to insure the highest efficiency of operation.

While this mechanism has been described as applied to rotary well drilling apparatus for oil wells, for which it was primarily developed, it will be understood that the mechanism may be installed on any apparatus to which it may be applicable.

I claim:

1. In an overload torque transmitting mechanism, a driven body member having a journal thereon, a drive member mounted on the journal, means fixed to the body member and forming clutch engaging faces at opposite sides of the drive member for clutch engagement therewith, one of said clutch engaging faces including a plate mounted slidably axially relative to the body member, one or more pins fixed to the body member and extending through the plate for sliding movement of the plate lengthwise thereof, coiled springs sleeved over the pins and bearing on the plate yieldably urging the plate toward the drive member, a ring surrounding the body member and slidably receiving the pins therein and bearing on the coiled springs, and a nut threaded on the body member beside the ring and acting on the ring to vary the tension on the springs.

2. In an overload torque transmitting mechanism, a driven body member having a journal thereon, a drive member mounted on the journal, means fixed to the body member and forming a clutch engaging face for engagement with the drive member, said means including a plurality of pins fixed to the body and extending axially thereof, a plate slidably mounted on the pins and fixed thereby against circumferential turning movement relative to the body and having means for clutch engagement with the drive member, springs sleeved over the pins and bearing against the plate, a ring slidably mounted on the body and having openings therein slidably receiving the pins, said ring being in position to bear against the springs, and a nut threaded on the body in pressure engagement with the ring and rotatable relative thereto for adjusting the tension of the springs.

3. In an overload torque transmitting mechanism, a driven body member having a journal thereon, a drive member mounted on the journal, means fixed to the body member and forming a clutch engaging face for engagement with the drive member, said means including a plurailty of pins fixed to the body and extending axially thereof, a plate slidably mounted on the pins and fixed thereby against circumferential turning movement relative to the body and having means for clutch engagement with the drive member, springs sleeved over the pins and bearing against the plate, a ring slidably mounted on the body and having openings therein slidably receiving the pins, said ring being in position to bear aganst the springs, a nut threaded on the body in pressure engagement with the ring and rotatable relative thereto for adjusting the tension of the springs, indicia carried by the periphery of the ring, and a pointer carried by the nut and extending into cooperating relation with the indicia for indicating the degree of turning of the nut with respect thereto.

GERALD J. NASH.

REFERENCES CITED

The following references are of record in the file of this patent:

UNITED STATES PATENTS

| Number | Name | Date |
|---|---|---|
| 424,383 | Walker | Mar. 25, 1890 |
| 517,439 | Cross | Apr. 3, 1894 |
| 1,136,366 | Randall | Apr. 20, 1915 |
| 1,158,190 | Edelman | Oct. 26, 1915 |
| 1,458,920 | Troll | June 12, 1923 |
| 1,596,132 | Waite | Aug. 17, 1926 |
| 1,684,679 | Nixon | Sept. 18, 1928 |
| 1,685,297 | Shone | Sept. 25, 1928 |
| 1,789,862 | Bricken | Jan. 20, 1931 |
| 2,345,444 | Angst | Mar. 28, 1944 |

FOREIGN PATENTS

| Number | Country | Date |
|---|---|---|
| 25,653 | Netherlands | Dec. 15, 1931 |